M. E. LYNN.
RECEPTACLE.
APPLICATION FILED APR. 30, 1921.
1,403,261. Patented Jan. 10, 1922.
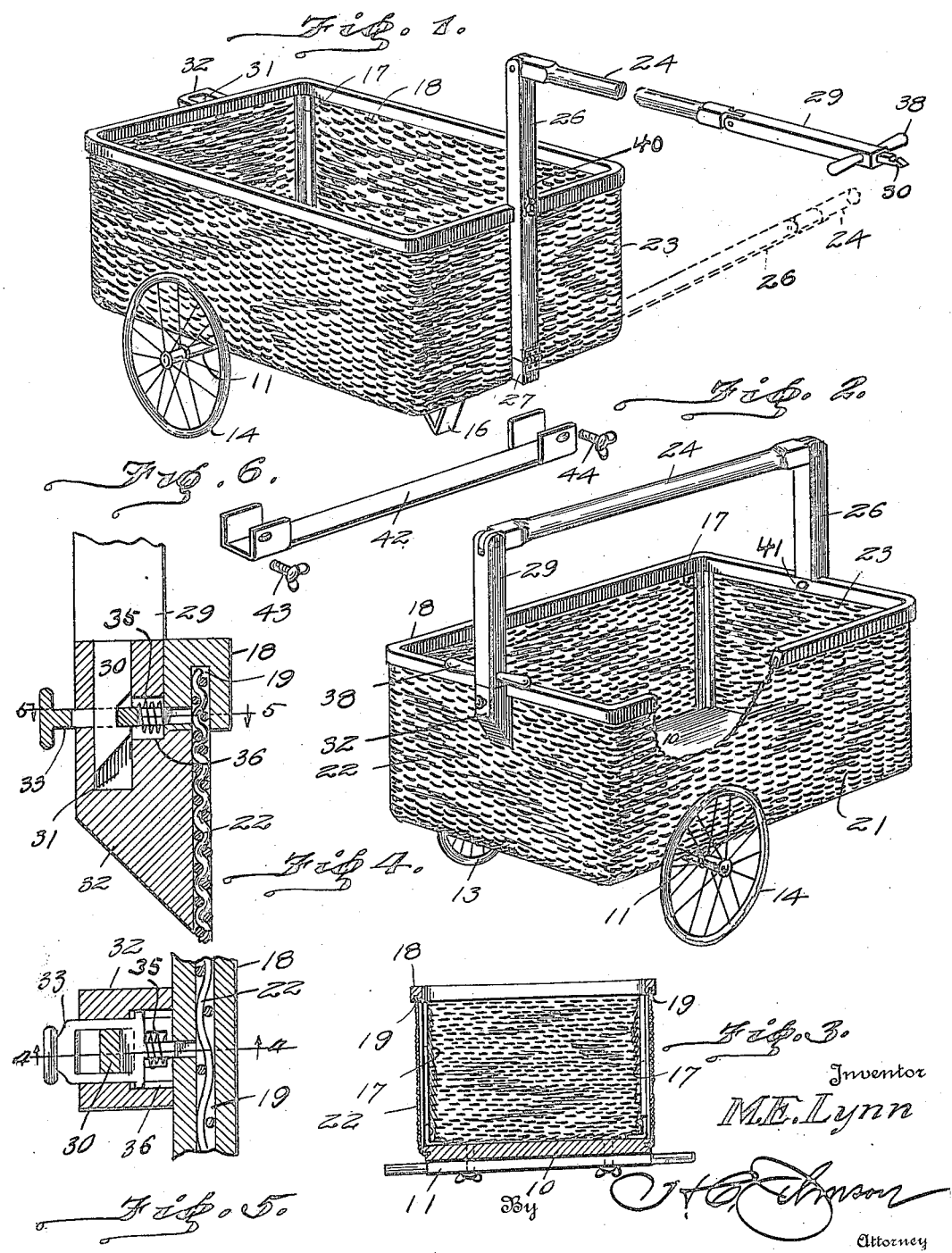

UNITED STATES PATENT OFFICE.

MARY E. LYNN, OF WASHINGTON, DISTRICT OF COLUMBIA.

RECEPTACLE.

1,403,261.   Specification of Letters Patent.   Patented Jan. 10, 1922.

Application filed April 30, 1921. Serial No. 465,723.

*To all whom it may concern:*

Be it known that I, MARY E. LYNN, a citizen of the United States, residing at Washington, in the District of Columbia, have invented certain new and useful Improvements in Receptacles, of which the following is a specification.

This invention relates to a combined basket and vehicle.

The object is to provide a receptacle designed especially for use in conveying supplies from the market or market store to the home, the device being so constructed or mounted that it may be used as an ordinary basket and may also be employed as a wheeled vehicle, so that a somewhat heavy load may readily be transported.

A further object is to provide a device of the character indicated which shall include a pair of wheels and a collapsible handle, the latter serving, when required, as a draft element, so that the receptacle may be drawn or pushed as a cart, and may readily be lifted into a motor car, or carried from the sidewalk into the house.

A still further object is to provide a device adapted for the purpose specified, and equally adapted for use as a child's wagon or cart.

With the foregoing and other objects in view, the invention consists in the novel construction and arrangement of elements hereinafter described and claimed, it being understood that modifications may be made, within the scope of the claims, without departing from the spirit of the invention.

In the accompanying drawings,

Figure 1 is a perspective view of the device, one end of the handle being detached.

Figure 2 is also a perspective view, both ends of the handle being secured,

Figure 3 is a view in vertical transverse section,

Figure 4 is a fragmentary view in vertical section, showing the manner of securing the end of the handle, the section being on line 4—4 of Figure 5, Figure 5 is a section on line 5—5 of Figure 4.

Figure 6 is a perspective view of a brace for retaining the elements of the handle in an extended position.

The bottom 10 is mounted on an axle 11, the latter carrying ground wheels 13 and 14. Metallic wheels are preferably employed, and the wheels are provided with rubber tires 15. A bracket 16 serves to support the forward end, so that when standing still, the bottom is approximately on a level, but when being drawn or pushed the bracket will of course be elevated slightly, with the body or the receptacle per se, and will clear the ground.

Mounted at the corners of element 10 are uprights 17, rigidly connected with element 10, and also rigid with reference to the upper frame 18, approximately rectangular in configuration and having rounded corners. The frame is provided with a groove 19 on its under side and the edges of the bottom element 10 are also grooved. The side walls of the receptacle or body of the vehicle are designated 20 and 21 and the end walls 22 and 23, these walls being continuous if desired, and the edge portions thereof entering the aforesaid grooves in the frame 18 and the element 10.

The handle is an important feature of the device, as it permits of the transformation of the article from a receptacle to a wagon body, in the sense that a draft element is provided. The wheels and axle may be retained at all times, or these elements may be detachable if desired, so that a complete transformation may be effected.

The central portion of the handle is designated 24, and has pivotal connection at 25 with an element 26, shown in Figures 1 and 2 as in an upright position. The lower end of member 26 is hingedly connected with a block 27 secured to element 10, and member 26 is provided with a cutaway portion 28, fitting over the edge of frame 18, so that it is practically locked to the frame.

The element 24 is also pivotally connected with member 29 provided with a projecting notched element 30 entering recess 31 in element 32 mounted as shown.

The locking device 33 is in the form of a plate member provided with an aperture 34 through which the notched end of element 30 projects, engagement being effected under the action of spring 35 located in aperture 36. A handle 38 extends transversely with reference to element 29, and is useful when the handle is employed as a tongue or draft element. The extreme end of member 30 is beveled, so that the lock acts automatically when the parts assume the position shown in Figures 2 and 4.

Since the uprights 17 are rigidly connected with bottom 10, the strain due to the weight of the contents of the device will be transferred through the handle to block 32, thence through frame 18 and uprights 17 to the bottom, thereby relieving the side walls. An especially suitable bail shaped handle is thus provided.

If it is desired to retain the handle in the position shown in Figure 1, this may be done by applying thumb nut 40 to bolt 41 passing through the adjacent element of frame 18. If the handle is caused to assume the dotted line position of Figure 1, the draft will be directly through the connection with bottom member 10, thus relieving the side walls.

In order to retain the tongue in an extended position, with all parts in alinement, brace 42 may be applied in the manner shown, so that the elements of the handle or tongue will be non-collapsible. The retaining devices for the brace are designated 43 and 44.

What I claim is—

1. A device of the class described, comprising a bottom and side walls connected with the bottom, and a handle permanently connected at one end with the bottom, said handle comprising a plurality of sections adapted to be moved to a position for forming a bail-shaped element, and being extensible for forming a tongue.

2. A device of the class described, comprising a bottom and side walls, and a bail shaped handle including elements pivotally connected, said elements being movable into a position in alinement, for forming a tongue.

3. A device of the class described, comprising a receptacle having bottom and side walls, an element hingedly connected with the bottom, a plurality of members pivotally connected with the hinged element, a socket member mounted on one of the walls, opposite the hinge connection, and means for locking one of the pivoted members within the socket and retaining the pivoted and hinged elements in position for forming a handle extending across the top of the receptacle.

4. A device of the class described, comprising a bottom and side walls, wheels and means for mounting the latter below the bottom, and a bail shaped handle formed in sections and connected with the side walls, one of the sections being detachable from the adjacent wall, and the sections being extensible into a position in alinement, for forming a tongue.

5. A device of the class described, comprising a receptacle, wheels and means for mounting the latter below the receptacle, and means connected with the receptacle for forming a jointed and foldable bail shaped handle extensible in an approximately straight line from the bottom of the receptacle or from a point above the top for forming a tongue.

6. A device of the class described, comprising a receptacle, a handle formed in collapsible sections one of which is permanently connected with the receptacle and said handle being convertible from bail shape to the form of a pole.

7. A device of the class described, comprising a receptacle having a bottom, and including a frame rigidly connected with the bottom, a handle permanently connected at one end with the bottom, extending across the receptacle and detachably connected at the other end with said bottom, through the elements of the frame, whereby strain is transferred directly from the bottom to the handle, said handle being convertible from bail shape to the form of a pole.

In testimony whereof I affix my signature.

MARY E. LYNN.